Patented Jan. 23, 1923.

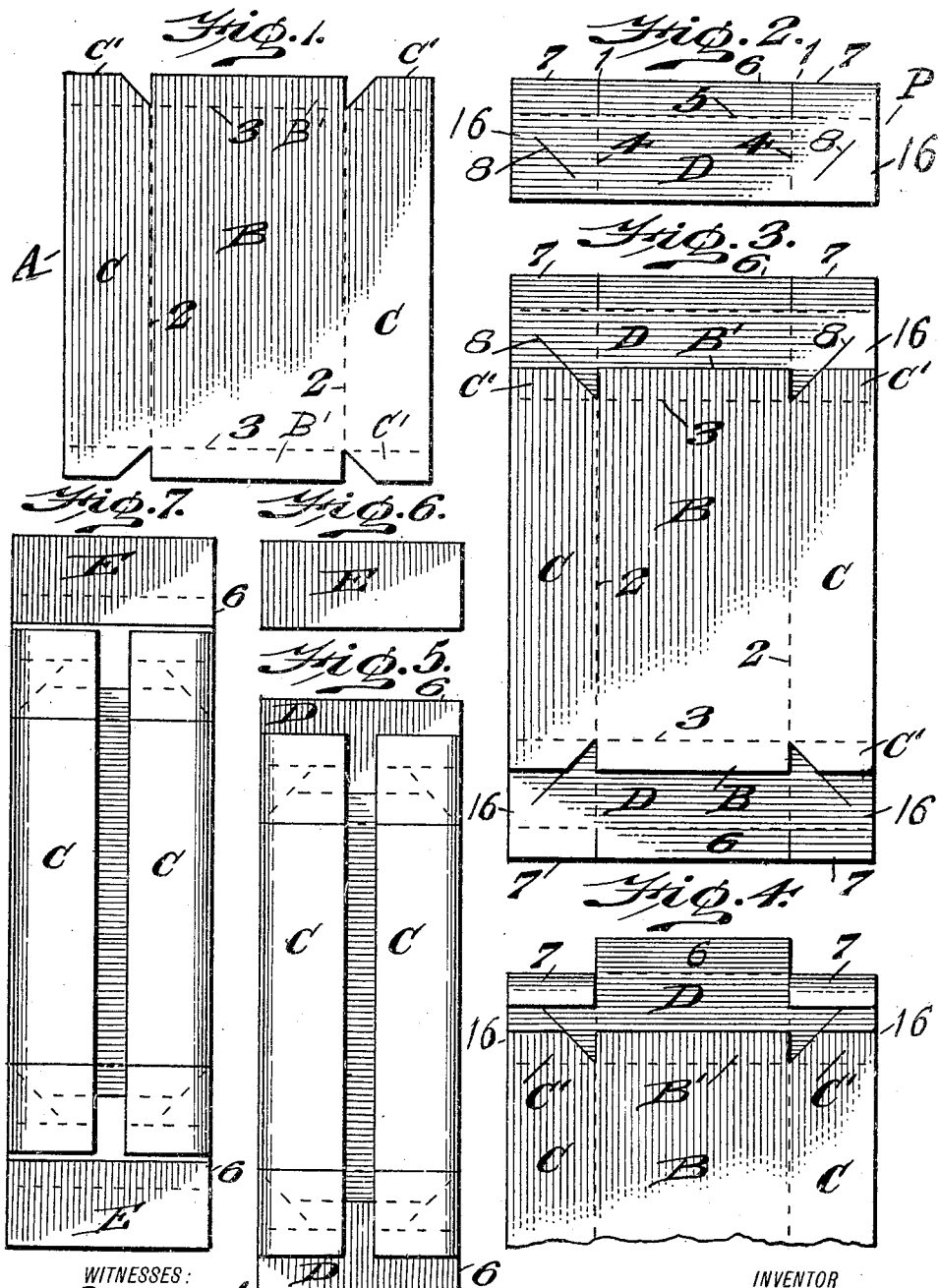

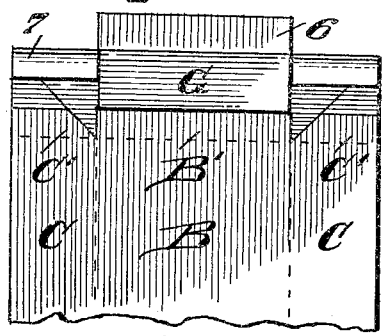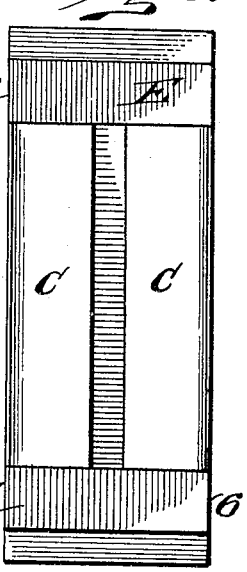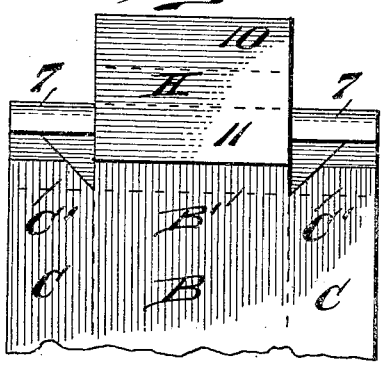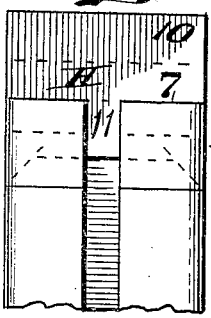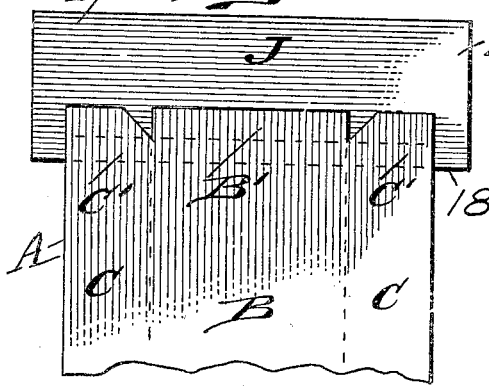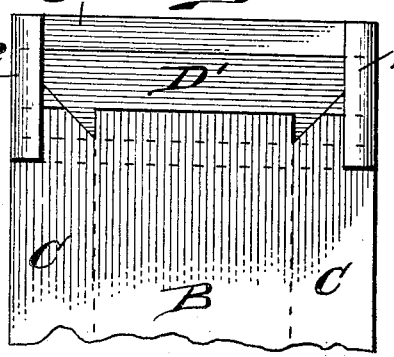

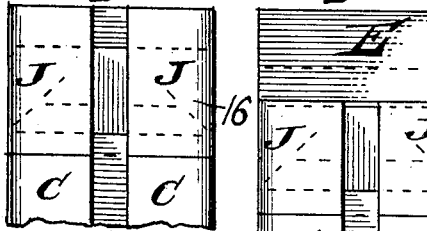
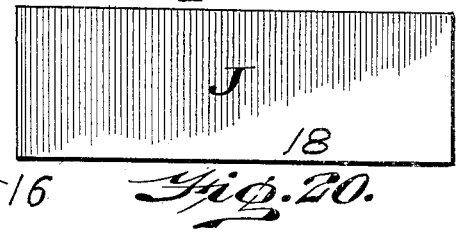
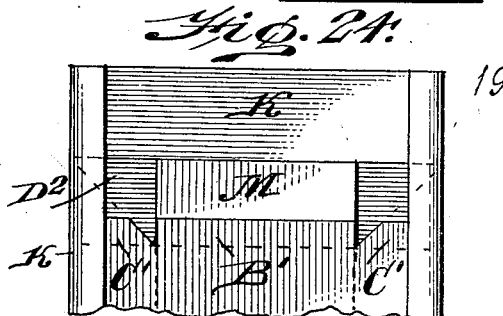
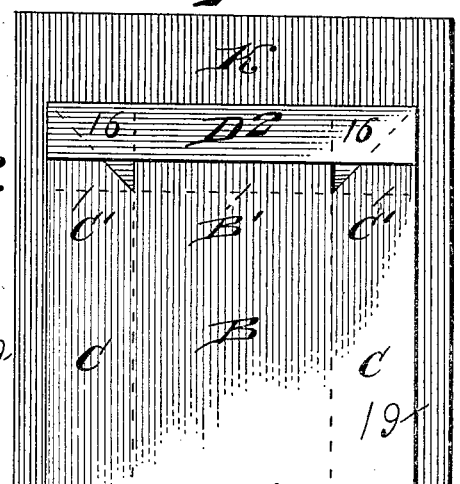
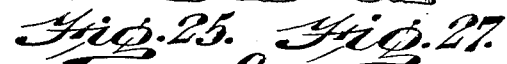
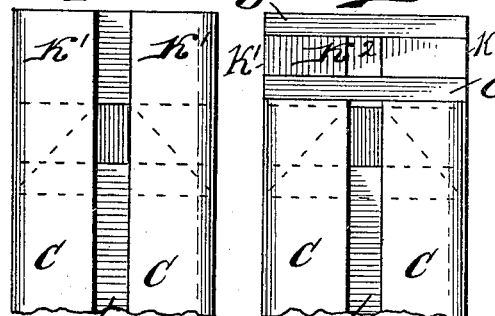
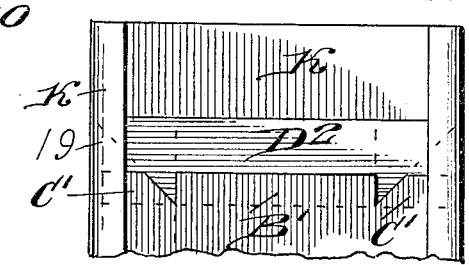

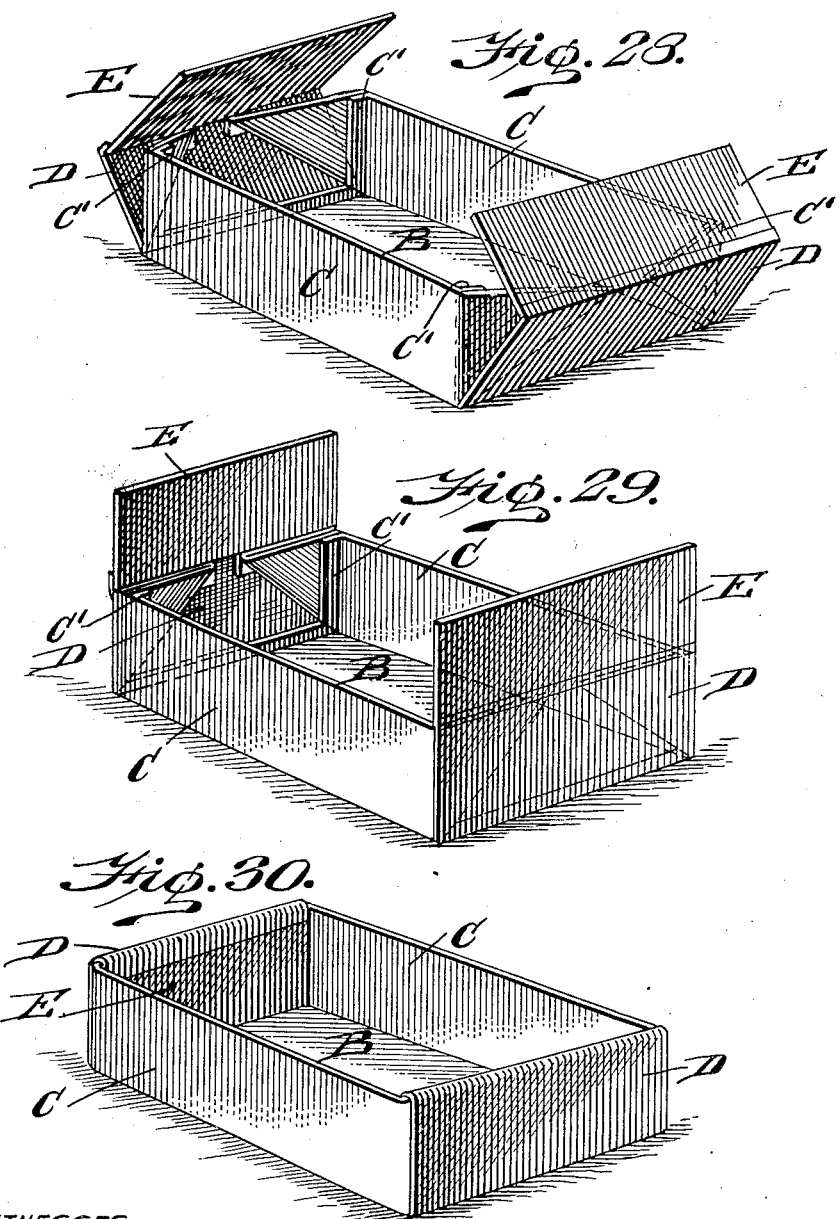

1,443,056

UNITED STATES PATENT OFFICE.

STAFFORD F. SUTHERLAND, OF PHILADELPHIA, PENNSYLVANIA, ASSIGNOR TO SUTHERLAND COLLAPSIBLE PAPER BOX COMPANY, OF PHILADELPHIA, PENNSYLVANIA, A CORPORATION OF DELAWARE.

COLLAPSIBLE FOLDING BOX.

Application filed May 17, 1921. Serial No. 470,329.

*To all whom it may concern:*

Be it known that I, STAFFORD F. SUTHERLAND, a citizen of the United States, residing in the city and county of Philadelphia and State of Pennsylvania, have invented certain new and useful Improvements in Collapsible Folding Boxes, of which the following is a specification.

My invention relates to folding-boxes and especially to that type known as collapsible boxes and the object of my invention is to provide an improved box of this character that is simple in construction, inexpensive of manufacture and can be very easily and very quickly set up (erected in box form) and is securely held in erect position after it is set up, and also presents a very neat appearance. Another object of my invention is to provide a collapsible folding-box, that may be made of cheap box-board (such as is now used in the making of what is known as set-up boxes, boxes that are made set-up, or erect and are not collapsible) and covered or partly covered with paper or other suitable material.

A further object of my invention is to provide a box having a blank from which the bottom and side-walls of the box are formed and another blank, scored or creased and slit in a novel manner and from which an end-wall and its adjacent corner-folds are formed; and attaching these blanks in making the box.

The objects and advantages of my improved box, will be readily apparent in this specification when taken in connection with the accompanying drawings, in which Fig. 1 is a blank from which the bottom and side-walls of the box are formed; Fig. 2 is a blank from which the end-wall and its adjacent corner-folds are formed; Figs. 3 and 4 show the blank Fig. 2, attached to opposite ends of the blank Fig. 1; Fig. 5 shows the side-walls and the corner-folds, folded inwardly; Fig. 6 is a locking-flap; Fig. 7 shows the locking-flap attached to the end-wall; Fig. 8 shows the complete box with the flaps folded on the box; Fig. 9 is an end-piece; Fig. 10 shows this end-piece on the end-wall; Fig. 11 is a double flap; Fig. 12 shows this double flap attached to the end-wall; Fig. 13 shows the side-walls and the corner-folds folded inwardly; Fig. 14 is a facing-strip; Fig. 15 shows this facing-strip attached to the blank Fig. 1; Fig. 16 is the blank (Fig. 2) slightly modified; Fig. 17 shows the blank (Fig. 16) attached to the facing-strip; Fig. 18 shows the end-walls and the corner-folds, folded inwardly; Fig. 19 shows the locking-flap E (Fig. 6) attached to the facing-strip; Fig. 20 shows the blank Fig. 1 attached to and covered by a covering-sheet; Fig. 21 is a slight modification of the blank Fig. 16; Fig. 22 shows this blank (Fig. 21) attached to the covering-sheet; Fig. 23 is an end-piece; Fig. 24 shows this end-piece on the blank Fig. 21; Fig. 25 shows the side-walls and corner-folds of this box (Fig. 24) folded inwardly; Fig. 26 is a binding-strip; Fig. 27 shows binding-strips (Fig. 26) attached to the covering-sheet; Figs. 28 and 29 are perspectives of the box partly set-up and Fig. 30 a perspective of the box fully set-up.

Referring to the drawings, Fig. 1 is the blank A from which the side-walls and bottom of the box are formed; it is a single piece of paper-board or other suitable material and is scored or creased longitudinally at the dotted lines 2 and transversely at the dotted lines 3, so as to facilitate the bending or folding of its parts at these lines, in forming the box; and it comprises the following integral and foldable parts—a bottom B and side-walls C. Extension strips $B^1$, integrally connected with the bottom and foldable, project from opposite ends of the bottom, and extension strips $C^1$ integrally connected with the side-walls C and foldable, project from opposite ends of the side walls. Fig. 2 is the blank P from which the end-wall and its adjacent corner-folds are formed; it is a single piece of thick paper or light box-board and is scored or creased at the dotted line 5 and at the dotted lines 4, and also slit at 1, and slit diagonally at 8, so as to facilitate the folding of its parts, at these lines and slits, and it comprises the following foldable parts—an end-wall D, opposite corner-folds 16 and the foldable extensions 6 and 7. This blank P (Fig. 2) is attached to opposite ends of the blank A (Fig. 1), by gumming its lower edge to the extension-strips $B^1$ $C^1$ of the bottom and side-walls, as shown in Fig. 3 and the extensions 7 of the corner-folds 16 are folded down inwardly as shown in Fig. 4. The side-walls C and the corner-folds 16 are then folded inwardly, as shown in Fig. 5, and a flap which I will call the locking-flap E, (Fig. 6), is attached to the extension 6 of the end-wall, as shown in Fig. 7; in this case it is gummed to the extension, but it may be attached in any other suitable manner. Fig. 8 shows the complete box with the flaps folded inwardly on the box. In this set-up condition of the box the end edges of the holding flaps frictionally engage the side walls of the box and are thus held in locking position. If it is desired to reinforce and strengthen the end-wall D of the blank P, an end-piece G (Fig. 9) may be gummed to the end-wall, before the side-walls and corner-folds are folded inwardly as shown in Fig. 10. A double flap H (Fig. 11) may also be used. This flap is scored or creased at the dotted line 9 and comprises an upper part 10 and a lower part 11 and it is attached to the end-wall with the upper part 10 projecting beyond the end-wall as shown in Fig. 12; and the side-walls and corner-folds are then folded inwardly and the inturned parts 7 of the corner-folds gummed to the lower part 11 of the flap as shown in Fig. 13. Fig. 14 is a paper facing-strip J, that may be used in making the box. The lower edge 18 of this strip is gummed to the blank A, as shown in Fig. 15 and the blank Fig. 16, which is the same as the blank P, Fig. 2, but modified, is then attached to the paper facing-strip J as shown in Fig. 17. In Fig. 18, the corner-folds 16 of this box are shown folded inwardly on the end-wall and in Fig. 19 the flap E (Fig. 6) is shown attached to the facing-strip J. Fig. 20, shows, the blank A (Fig. 1) attached to and covered by the covering-sheet K, and a blank (Fig. 21) which is the same as the blanks of Figs. 2 and 16, but modified, is also attached to the covering-sheet, as shown in Fig. 20. In this case, this blank (Fig. 21) when attached to the covering-sheet, will in union with extensions $B^1$ $C^1$, form the end-wall $D^2$ and the corner-folds 16 as shown in Fig. 20. The edges 19 of the covering-sheet K are turned over and pasted on the inner face of the blank, as shown in Fig. 22, and an end-piece M, Fig. 23 may be placed on the upper portion $D^2$ of the end-wall as shown in Fig. 24, and the side-walls and corner-folds then folded inwardly, as shown in Fig. 25 and binding-strips O Fig. 26, are then gummed to the projecting portions $K^1$ of the covering-sheet K, as shown in Fig. 27, and these binding-strips O in union with the portions $K^1$ of the sheet form a locking-flap $K^2$ that takes the place of the flap E before shown and described. In Figs. 28 and 29, the box is shown partly set-up and in Fig. 30, it is shown fully set-up. To set-up the box, from its flat form, it is only necessary to grasp both end walls and push them to an erect position, and the side-walls will automatically move to an erect position also; the other movable parts automatically moving to their respective positions, the locking-flaps moving downward in the box and against the inner faces of the end-walls and the corner-folds. The advantage of having the bottom and side-walls formed from one blank and the end-walls and corner-folds formed from another, is that the blank comprising the end-walls and corner-folds can then be of lighter board than the other and thus economize in stock.

Having fully described my invention, what I claim as new and desire to secure by Letters Patent is:

1. A collapsible box including foldable bottom and side walls, extension strips formed on said bottom and side walls, rigid end walls provided on certain of said extension strips, and locking flaps operatively connected to said end walls.

2. A collapsible box including foldable bottom and side walls, extension strips formed on said bottom and side walls, rigid end walls provided on certain of said extension strips, corner folds connecting said end walls and side walls, and locking flaps operatively connected to said end walls.

3. A collapsible box including foldable bottom and side walls, extensions on the ends of said bottom and side walls, strips operatively connected to certain of said extensions to provide in conjunction therewith rigid end walls, and locking flaps operatively connected to the end walls.

4. A collapsible box including foldable bottom and side walls, extensions on the ends of said bottom and side walls, strips operatively connected to certain of said extensions, to provide in conjunction therewith rigid end walls, said strips having weakened portions to form corner folds, and locking flaps operatively connected to the end walls.

5. A collapsible box including foldable bottom and side walls, extension strips on the bottom and side walls, end members secured to said extension strips forming rigid end walls and provided with weakened lines to form corner folds, and a locking flap secured to each of said end members.

6. A collapsible box including foldable bottom and side walls, integral extension strips on the bottom and side walls, end members secured to said extension strips forming rigid end walls and provided with weakened lines to form corner folds, and a locking flap secured to each of said end members.

7. A collapsible box including foldable bottom and side walls, relatively light end members secured to said bottom and side walls, weakened lines providing corner folds in said end members, said end members being further provided with slits forming extensions, and locking flaps secured to said extensions.

8. A collapsible box including foldable bottom and side walls, end members secured to said bottom and side walls and forming rigid end walls, corner folds in said end members, said end members being further provided with extensions, and locking flaps secured to said extensions.

9. A collapsible box including foldable bottom and side walls, end members provided with corner folds secured to said bottom and side walls, slits in the edge of each end member providing extensions, two of said extensions being folded and secured to an intermediate portion of an end member, and a locking flap secured to another of said extensions.

STAFFORD F. SUTHERLAND.